(12) United States Patent
Yoshimune et al.

(10) Patent No.: US 12,467,470 B2
(45) Date of Patent: Nov. 11, 2025

(54) COMPRESSOR

(71) Applicant: MITSUBISHI HEAVY INDUSTRIES COMPRESSOR CORPORATION, Tokyo (JP)

(72) Inventors: Toru Yoshimune, Hiroshima (JP); Takashi Oda, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 18/061,261

(22) Filed: Dec. 2, 2022

(65) Prior Publication Data
US 2023/0184256 A1 Jun. 15, 2023

(30) Foreign Application Priority Data
Dec. 9, 2021 (JP) .................................. 2021-199943

(51) Int. Cl.
*F04D 29/056* (2006.01)
*F04D 17/10* (2006.01)
(Continued)

(52) U.S. Cl.
CPC ........... *F04D 29/056* (2013.01); *F04D 17/10* (2013.01); *F04D 29/063* (2013.01); *F04D 17/12* (2013.01); *F04D 17/122* (2013.01); *F04D 29/057* (2013.01); *F16C 17/03* (2013.01); *F16C 17/22* (2013.01); *F16C 35/02* (2013.01)

(58) Field of Classification Search
CPC ...... F04D 29/056; F04D 17/10; F04D 29/063; F04D 17/12; F04D 17/122; F04D 29/057; F16C 17/22; F16C 17/03; F16C 35/02
See application file for complete search history.

(56) References Cited

U.S. PATENT DOCUMENTS 3,985,405 A * 10/1976 Okano .................... F16C 17/03
                                                            384/117
4,515,486 A *  5/1985 Ide ......................... F16C 17/06
                                                            384/119

(Continued)

FOREIGN PATENT DOCUMENTS

JP         H0842560 A  *  2/1996
JP       H10-292816 A      11/1998
(Continued)

*Primary Examiner* — Nathaniel E Wiehe
*Assistant Examiner* — Art Golik
(74) *Attorney, Agent, or Firm* — Osha Bergman Watanabe & Burton LLP

(57) ABSTRACT

A compressor includes a tilting pad bearing supporting a rotating shaft in a casing. The tilting pad bearing includes a bearing pad being in sliding contact with an outer circumferential surface of the rotating shaft and a pivot supporting the bearing pad in a swingable manner. The casing includes a groove portion having an annular shape recessed in the axial direction and extending in the circumferential direction, and a connection portion configured to connect an inner circumferential region of an inner side in the radial direction with respect to the groove portion to an outer circumferential region of the outer side in the radial direction with respect to the groove portion. The connection portion overlaps with the pivot as viewed from the axial direction.

5 Claims, 4 Drawing Sheets

(51) Int. Cl.
*F04D 29/063* (2006.01)
*F04D 17/12* (2006.01)
*F04D 29/057* (2006.01)
*F16C 17/03* (2006.01)
*F16C 17/22* (2006.01)
*F16C 35/02* (2006.01)

(56) References Cited

U.S. PATENT DOCUMENTS

| | | | |
|---|---|---|---|
| 8,292,507 B2 * | 10/2012 | Hirai | F16C 17/03 |
| | | | 384/312 |
| 10,113,446 B2 * | 10/2018 | Kishi | F01D 25/16 |
| 10,364,820 B1 * | 7/2019 | Oda | F04D 29/622 |
| 2013/0028731 A1 * | 1/2013 | Mimura | F16C 17/03 |
| | | | 384/309 |
| 2019/0128272 A1 * | 5/2019 | Oda | F16C 17/26 |

FOREIGN PATENT DOCUMENTS

| | | | | |
|---|---|---|---|---|
| JP | 4980699 B2 | | 7/2012 | |
| JP | 2013167321 A | * | 8/2013 | |
| JP | 2017172697 A | * | 9/2017 | |
| JP | 2019-086023 A | | 6/2019 | |
| WO | WO-2018153681 A1 | * | 8/2018 | |
| WO | WO-2018173502 A1 | * | 9/2018 | ........... F01D 25/166 |
| WO | 2019-207761 A1 | | 10/2019 | |

\* cited by examiner

COMPRESSOR

BACKGROUND OF THE INVENTION

Field of the Invention

The present disclosure relates to a compressor.
Priority is claimed on Japanese Patent Application No. 2021-199943, filed on Dec. 9, 2021, the content of which is incorporated herein by reference.

Description of Related Art

In a compressor, such as a centrifugal compressor, a working fluid having a temperature of 0° C. or lower (also referred to as a "low temperature"), such as ethylene gas or propylene gas, may be compressed. In a case in which the working fluid having a low temperature flows through a flow path of the compressor, the temperature of a casing of the compressor disposed around the flow path or a member, such as a bearing supporting a rotating shaft, drops. As a result, heat shrinkage occurs in these members. Due to the heat shrinkage, there is a probability that a clearance between the rotating shaft and the bearing is reduced and seizure occurs in the bearing.

On the other hand, Patent Document 1 discloses a configuration in which a groove extending along a vertical direction and a longitudinal direction of a rotating shaft is formed at one end portion of a casing of a centrifugal compressor at a position on an outer side in a radial direction of a bearing. In such a configuration, the heat shrinkage of the casing due to sucking in the working fluid having a low temperature is blocked by the groove, and the reduction of the clearance between the rotating shaft and the bearing is prevented.

[Patent Document 1] Japanese Patent No. 4980699

SUMMARY OF THE INVENTION

However, the casing of the centrifugal compressor disclosed in Patent Document 1 is a horizontally divided type and is divided into an upper half casing and a lower half casing. The bearing is held by a bearing holder with respect to the lower half casing. In such a configuration, the bearing is not in direct contact with the upper half casing and is less likely to be affected by the heat shrinkage of the upper half casing. Therefore, the groove is formed only in the lower half casing.

On the other hand, in a case in which the casing of the compressor is a vertically divided type, the casing is divided to be aligned in a horizontal direction of a member having an annular shape, such as a head or a diaphragm. In such a configuration, the bearing is supported by a bearing supporting portion having a semicircular shape formed in the annular head. Therefore, the bearing is affected by the heat shrinkage of the head over an entire circumference of the bearing.

The present disclosure provides a compressor capable of stably supporting a bearing while suppressing an influence of heat shrinkage occurring over an entire circumference of the bearing on the bearing.

The present disclosure relates to a compressor including a rotor having a rotating shaft extending in an axial direction in which an axis extends and is rotatable around the axis, a casing having a suction port sucking a working fluid inside and configured to cover the rotor from an outer side in a radial direction with respect to the axis, and a tilting pad bearing configured to support the rotating shaft in the casing, wherein the tilting pad bearing includes a plurality of bearing pads arranged at intervals in a circumferential direction about the axis and being in sliding contact with an outer circumferential surface of the rotating shaft, and a pivot supported by the casing and configured to support each of the plurality of bearing pads in a swingable manner, the casing includes: an annular groove portion being recessed in the axial direction and extending in the circumferential direction at an end portion close to the suction port at a position distant from the tilting pad bearing to the outer side in the radial direction; and a connection portion connecting an inner circumferential region of an inner side in the radial direction with respect to the annular groove portion to an outer circumferential region of the outer side in the radial direction with respect to the annular groove portion to cross part of the annular groove portion in the circumferential direction as viewed from the axial direction, and the connection portion is disposed at a position at which a position in a width direction overlaps with the pivot as viewed from the axial direction, the width direction is orthogonal to a vertical direction.

With the compressor according to the present disclosure, it is possible to stably support the bearing and suppress the influence of the heat shrinkage occurring over the entire circumference of the bearing on the bearing.

DETAILED DESCRIPTION OF THE INVENTION

In the following, an embodiment of a compressor according to the present disclosure will be described with reference to the accompanying drawings. However, the present disclosure is not limited only to the embodiment.

(Configuration of Compressor)

Figure 1:
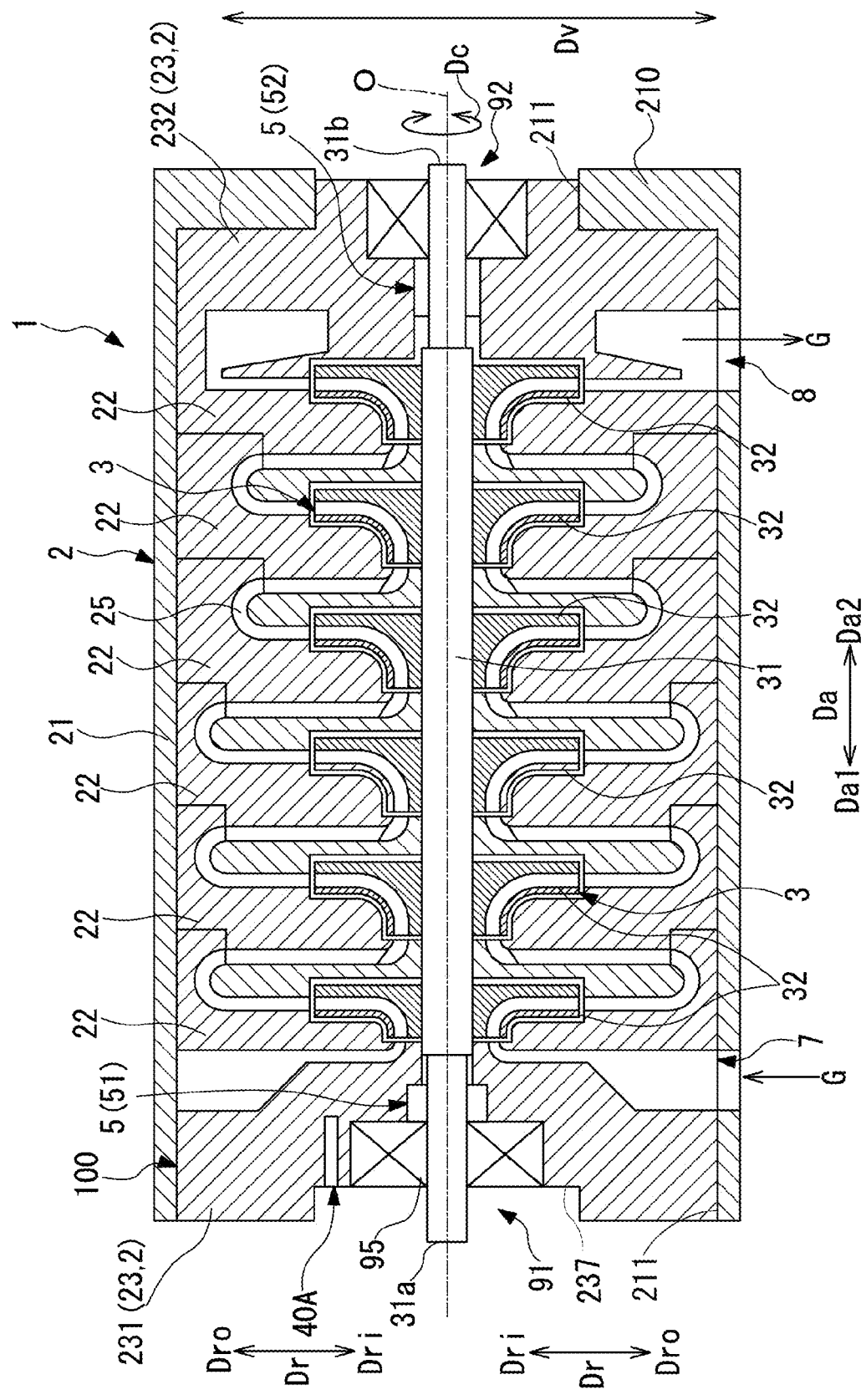
FIG. 1 is a schematic diagram showing a configuration of a centrifugal compressor according to an embodiment of the present invention.

A centrifugal compressor (compressor) 1 which is the compressor according to the present embodiment compresses gas having a temperature of 0° C. or lower as a working fluid G. The centrifugal compressor 1 according to the present embodiment is, for example, a uniaxial multi-stage centrifugal compressor (multi-stage centrifugal compressor) that compresses ethylene gas or propylene gas. As shown in FIG. 1, the centrifugal compressor 1 mainly includes a casing 2, a rotor 3, a seal portion 5, a first bearing portion 91, and a second bearing portion 92.

It should be noted that, in the following, a direction in which an axis O of the rotor 3, which will be described later, extends is referred to as an axial direction Da. A radial direction with respect to the axis O is simply referred to as a radial direction Dr. In addition, a direction around the rotor 3 about the axis O is referred to as a circumferential direction Dc.

(Configuration of Casing)

The casing 2 covers the rotor 3 from an outer side Dro in the radial direction Dr. The casing 2 according to the present embodiment has an external casing 21, a plurality of diaphragms 22, and a pair of heads 23.

The external casing 21 has a cylindrical shape about a center axis disposed at the same position as the axis O of the rotor 3. A first side Da1 (one side) of the external casing 21 in the axial direction Da is open in a size through which a bundle 100 described later can be inserted. An end plate 210 is formed on a second side Da2 (the other side) of the external casing 21 in the axial direction Da. The end plate 210 has a plate shape extending orthogonally to the axial direction Da.

The plurality of diaphragms 22 are disposed to cover the rotor 3 from the outer side Dro in the radial direction Dr. The plurality of diaphragms 22 are disposed inside the external casing 21. The diaphragm 22 has an annular shape about the axis O. The plurality of diaphragms 22 are laminated to have a cylindrical shape extending in the axial direction Da. In the adjacent diaphragms 22, the outer circumferential surfaces are fixed to each other by welding or a bolt. By fixing the plurality of diaphragms 22 to each other, a casing flow path 25 is formed to introduce the working fluid into an impeller 32 is formed inside the plurality of diaphragms 22. In addition, the plurality of diaphragms 22 constitute the bundle 100 together with the head 23, the rotor 3, the seal portion 5, the first bearing portion 91, and the second bearing portion 92. The bundle 100 is housed in the external casing 21. In the bundle 100, the rotor 3, the plurality of diaphragms 22, the plurality of heads 23, the seal portion 5, the first bearing portion 91, and the second bearing portion 92 are made movable together and in a state of mass.

The casing flow path 25, through which the working fluid G flows, is formed inside the casing 2. The suction port 7, which allows the working fluid G to flow from the outside into the casing flow path 25 formed inside the casing 2, is formed on the first side Da1 in the axial direction Da. In the present embodiment, the suction port 7 sucks the working fluid G into a lower half portion of the casing 2 from a lower side in a vertical direction Dv with respect to the casing 2. The temperature of the working fluid G in the suction port 7 is, for example, 0° C. or lower. In addition, on the second side Da2 of the casing 2 in the axial direction Da, a discharge port 8 that discharges the working fluid G to the outside is formed continuously with the casing flow path 25. The discharge port 8 discharges the working fluid G which flowing through the casing flow path 25 and which compressed to the outside of the casing 2 from the lower side in the vertical direction Dv with respect to the casing 2.

The pair of heads 23 are members having an annular shape and are disposed inside the external casing 21. The heads 23 are formed in sizes capable of closing the openings 211 at respective ends of the external casing 21. As the heads 23 according to the present embodiment, a suction side head 231 disposed on the first side Da1 in the axial direction Da with respect to the plurality of diaphragms 22, and a discharge side head 232 disposed on the second side Da2 in the axial direction Da with respect to the plurality of diaphragms 22 are provided.

The suction side head 231 is disposed at a position closer to the suction port 7 than the discharge side head 232. The suction side head 231 forms the suction port 7 together with the diaphragm 22 disposed on the first side Da1 in the most axial direction Da. The suction side head 231 is fixed to the plurality of integrated diaphragms 22 by a bolt or the like. As a result, the suction side head 231 is integrated with the diaphragm 22.

The suction side head 231 according to the present embodiment has a recess portion 237. The recess portion 237 is recessed toward the second side Da2 in the axial direction Da to form a circular shape about the axis O as viewed from the first side Da1 in the axial direction Da. A bottom surface 237b of the recess portion 237 is on a plane orthogonal to the axis O.

The discharge side head 232 is disposed at a position closer to the discharge port 8 than the suction side head 231. The discharge side head 232 forms the discharge port 8 together with the diaphragm 22 disposed on the second side Da2 in the most axial direction Da. The discharge side head 232 is fixed to the plurality of integrated diaphragms 22 by a bolt or the like. As a result, the discharge side head 232 is integrated with the diaphragm 22.

(Configuration of Rotor)

The rotor 3 is housed inside the casing 2. The rotor 3 is rotatable around the axis O. The rotor 3 according to the present embodiment has a rotating shaft 31 and a plurality of the impellers 32.

The rotating shaft 31 extends in a columnar shape in the axial direction Da about the axis O. Both end portions 31a and 31b of the rotating shaft 31 in the axial direction Da protrude from the casing 2 to the outer side in the axial direction Da. The first end portion 31a, which is an end portion of the first side Da1 in the axial direction Da of the rotating shaft 31, protrudes in the axial direction Da with respect to the suction side head 231. The second end portion 31b, which is an end portion of the second side Da2 in the axial direction Da of the rotating shaft 31, protrudes in the axial direction Da with respect to the discharge side head 232.

The impeller 32 is supported by the rotating shaft 31 to be rotatable around the axis O. The plurality of impellers 32 are arranged at intervals in the axial direction Da of the rotating shaft 31. It should be noted that, although FIG. 1 shows an example of a case in which six impellers 32 are formed, at least one or more impellers 32 need only be provided. Each impeller 32 uses centrifugal force to compress the gas by rotation. The impeller 32 compresses the working fluid G sucked from the first side Da1 in the axial direction Da and discharges the compressed working fluid G to the outer side Dro in the radial direction Dr.

In such a centrifugal compressor 1, the working fluid G is introduced into the casing flow path 25 from the suction port 7 closer to the first end portion 31a than a center position of the rotating shaft 31 in the axial direction Da. The working fluid G is compressed at each of the impellers 32 rotating around the axis O together with the rotating shaft 31, flows from an inner side Dri in the radial direction Dr to the outer side Dro in the radial direction Dr, and is discharged to the casing flow path 25. The casing flow path 25 guides the working fluid G discharged from the impeller 32 on an upstream side positioned on the first side Da1 in the axial direction Da to the impeller 32 on a downstream side positioned on the second side Da2 in the axial direction Da. The working fluid G is compressed by passing through the impellers 32 provided in a plurality of stages in the casing 2 and the casing flow path 25. Thereafter, the working fluid G is discharged from the discharge port 8 closer to the second end portion 31b than the center position of the rotating shaft 31 in the axial direction Da.

(Configuration of Seal Portion)

The seal portion 5 seals the area between the rotor 3 and the casing 2. The seal portion 5, according to the present embodiment has a first seal portion 51 disposed at a position closer to the first end portion 31a than the suction port 7 in the axial direction Da and a second seal portion 52 disposed at a position closer to the second end portion 31b than the discharge port 8 in the axial direction Da. The first seal portion 51 is fixed to the suction side head 231. The first seal portion seals between the suction side head 231 and the rotating shaft 31. The second seal portion 52 is fixed to the discharge side head 232. The second seal portion seals between the discharge side head 232 and the rotating shaft 31.

(Configurations of First Bearing Portion and Second Bearing Portion)

The first bearing portion 91 and the second bearing portion 92 support the rotor 3 rotatable around the axis O at both end portions of the casing 2 in the axial direction Da. The first bearing portion 91 as the bearing portion according to the present embodiment is disposed at a position closer to the first end portion 31a than the suction port 7 in the axial direction Da. The first bearing portion 91 rotatably supports the rotating shaft 31 with respect to the suction side head 231. The second bearing portion 92 is disposed at a position closer to the second end portion 31b than the discharge port 8 in the axial direction Da. The second bearing portion 92 rotatably supports the rotating shaft 31 with respect to the discharge side head 232. Any one of the first bearing portion 91 and the second bearing portion 92 has a thrust bearing (not shown) in addition to a tilting pad bearing 95 described later.

Figure 2:
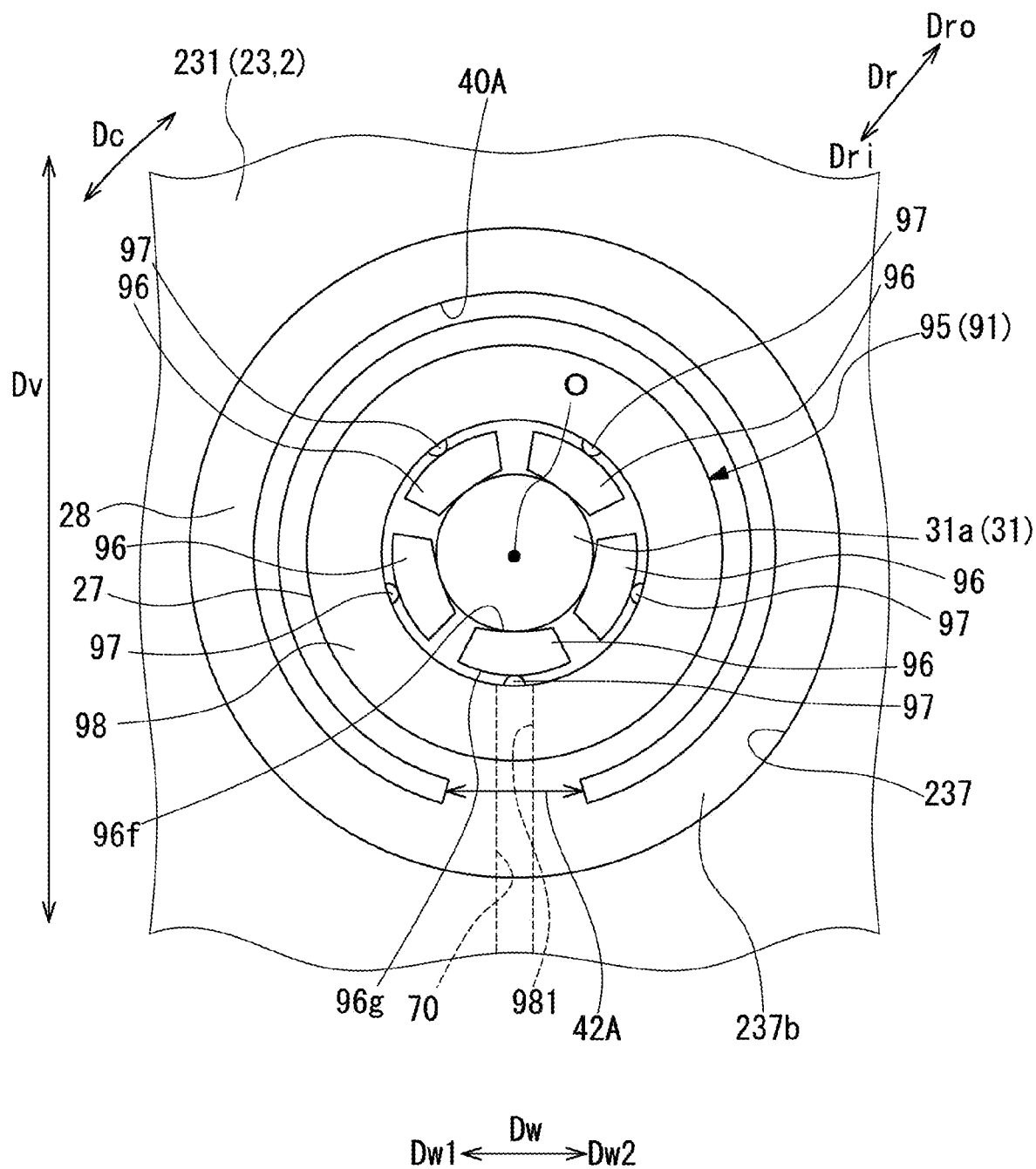
FIG. 2 is an enlarged view of a first bearing portion.
Figure 3:
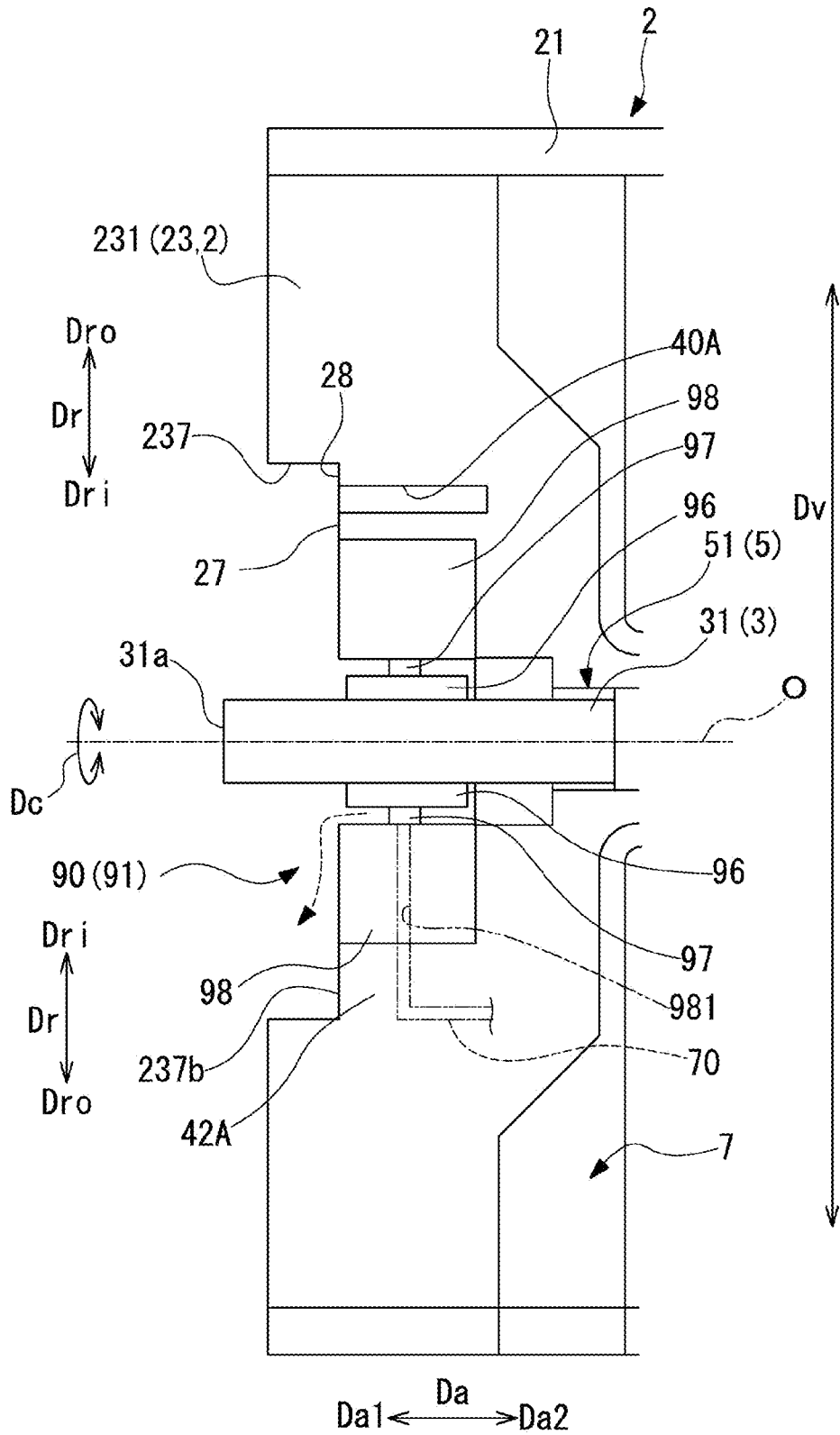
FIG. 3 is a cross-sectional view showing the first bearing portion shown in FIG. 2.

As shown in FIGS. 2 and 3, the first bearing portion 91 and the second bearing portion 92 have the tilting pad bearing 95. The tilting pad bearing 95 supports a load (radial load) of the rotor 3 in the radial direction Dr. The tilting pad bearing 95 includes a plurality of bearing pads 96, a plurality of pivots 97, and a bearing housing 98. In the present embodiment, the tilting pad bearing 95 of the first bearing portion 91 will be described as an example, and the tilting pad bearing 95 of the second bearing portion 92 also has the same configuration except that the tilting pad bearing 95 of the second bearing portion 92 is fixed to the discharge side head 232.

Each bearing pad 96 is in sliding contact with the outer circumferential surface of the rotating shaft 31 via lubricating oil (not shown). The bearing pad 96 is formed in an arc shape in a cross-sectional view (cross section viewed from the axial direction Da) orthogonal to the axis O of the rotating shaft 31. The bearing pad 96 has a curved plate shape which is wide in the circumferential direction. The bearing pad 96 has a pad surface 96f that faces the inner side Dri in the radial direction Dr and a pad back surface 96g that faces the outer side Dro in the radial direction Dr. The pad surface 96f is a curved surface having a smaller curvature than the outer circumferential surface of the rotating shaft 31. Therefore, the pad surface 96f can be in sliding contact with the outer circumferential surface of the rotating shaft 31 by line contact or point contact. The plurality of bearing pads 96 are arranged at equal intervals in the circumferential direction Dc. In the present embodiment, five bearing pads 96 are arranged at equal intervals in the circumferential direction Dc. In the present embodiment, among the plurality of bearing pads 96, the bearing pad 96 at the lowermost portion is positioned directly below (directly below the axis O) with respect to the rotating shaft 31 in the vertical direction Dv.

Each pivot of the plurality of pivots 97 supports each bearing pad 96 in a swingable manner. Each pivot of the plurality of pivots 97 corresponds to one of the plurality of bearing pads 96. Each pivot of the plurality of pivots 97 is disposed on the outer side Dro in the radial direction Dr with respect to each pivot of the plurality of bearing pads 96. The plurality of pivots 97 are fixed to the bearing housing 98.

That is, the plurality of pivots 97 are supported indirectly by the casing 2 via the bearing housing 98. The pivot 97 points-supports or line-supports the pad back surface 96g of the bearing pad 96. In addition, the pivot 97 that supports the bearing pad 96 positioned directly below the vertical direction Dv (directly below the axis O) with respect to the rotating shaft 31 is positioned directly below the axis O. In addition, the center of gravity of the rotating shaft 31 is directly below the axis O, which is the center in a width direction Dw orthogonal to the vertical direction Dv. Therefore, in the tilting pad bearing 95, the pivot 97 positioned at the lowermost side in the vertical direction Dv is a load support point at which the tilting pad bearing 95 receives the load of the rotating shaft 31.

The bearing housing 98 is formed in an annular shape about the axis O. The bearing housing 98 is fixed to the suction side head 231 of the casing 2 over the entire circumference. The bearing housing 98 is housed in a hole recessed from the bottom surface 237b of the recess portion 237 as viewed from the axial direction Da. That is, the tilting pad bearing 95 is disposed to fit in the recess portion 237 as viewed from the axial direction Da. The pivot 97 is fixed to the inner circumferential surface of the bearing housing 98. The bearing housing 98 is formed with an oil supply path 981 for supplying the lubricating oil between the rotating shaft 31 and the bearing pad 96. The oil supply path 981 is connected to a lubricating oil supply unit 70 that supplies the lubricating oil to the tilting pad bearing 95. The lubricating oil supply unit 70 is connected to an external lubricating oil supply source (not shown) of the casing 2. The lubricating oil supplied from the lubricating oil supply unit 70 between the rotating shaft 31 and the bearing pad 96 via the oil supply path 981 is discharged into the recess portion 237.

(Configurations of Annular Groove Portion and Connection Portion)

The casing 2 further has an annular groove portion 40A having an annular shape and a connection portion 42A. The annular groove portion 40A according to the present embodiment is formed only on the suction side head 231 that forms the end portion close to the suction port 7 in the casing 2. The annular groove portion 40A is formed at a position distant from the tilting pad bearing 95 on the outer side Dro in the radial direction Dr. The annular groove portion 40A is formed so as to be recessed in the axial direction Da and to extend in the circumferential direction Dc with respect to the surface of the suction side head 231 facing the first side Da1 in the axial direction Da. As a result, the groove portion divides an end surface of the suction side head 231 as viewed from the axial direction Da into an inner circumferential region 27 of the inner side Dri in the radial direction Dr with respect to the annular groove portion 40A, and an outer circumferential region 28 of the outer side Dro in the radial direction Dr with respect to the annular groove portion 40A.

The annular groove portion 40A according to the present embodiment is formed in the suction side head 231 to be disposed in the recess portion 237 as viewed from the first side Da1 in the axial direction Da. Therefore, the annular groove portion 40A is recessed in the axial direction Da from the bottom surface 237b of the recess portion 237. The annular groove portion 40A is formed to form an arc shape about the axis O as viewed from the axial direction Da. The annular groove portion 40A is open at the bottom surface 237b and communicates with the space in the recess portion 237.

The connection portion 42A is formed to cross part of the annular groove portion 40A in the circumferential direction Dc as viewed from the axial direction Da. The connection portion 42A connects the inner circumferential region 27 and the outer circumferential region 28 divided by the annular groove portion 40A as viewed from the axial direction Da. The connection portion 42A is a region positioned on an extension line of the annular groove portion 40A extending in the circumferential direction Dc as viewed from the axial direction Da and is a region in which the annular groove portion 40A is not formed. That is, the annular groove portion 40A is formed as single groove on the bottom surface 237b such that a region other than the connection portion 42A surrounds the tilting pad bearing 95 as viewed from the axial direction Da. Therefore, in the bottom surface 237b, the inner circumferential region 27 is connected to the outer circumferential region 28 only via the connection portion 42A. The connection portion 42A is positioned on the lower side in the vertical direction Dv with respect to the axis O as viewed from the axial direction Da.

In addition, the connection portion 42A is disposed at a position at which a position in the width direction Dw overlaps with the pivot 97 as viewed from the axial direction Da. More specifically, the connection portion 42A is disposed at a position overlapping with the pivot 97, which is the load support point of the tilting pad bearing 95, in the width direction Dw as viewed from the axial direction Da. Further, the connection portion 42A is formed at a position overlapping with the suction port 7 as viewed from the axial direction Da. That is, the connection portion 42A is formed in the lower half of the suction side head 231 (lower side of the axis O) as viewed from the axial direction Da.

(Actions and Effects)

In the compressor 1 having the configuration described above, due to the influence of the temperature of the working fluid G having a low temperature flowing into from the suction port 7, the heat shrinkage occurs over the entire circumference and pushes the tilting pad bearing 95 inward into the suction side head 231. However, the annular groove portion 40A is formed at a position separated from the first bearing portion 91 in the radial direction Dr. As a result, the influence of the heat shrinkage is blocked by the annular groove portion 40A having an annular shape, and the shrinkage in the region of the inner side Dri in the radial direction Dr with respect to the annular groove portion 40A is suppressed. Therefore, in the suction side head 231, the shrinkage in the inner circumferential region 27 to which the tilting pad bearing 95 is fixed is suppressed as compared with the outer circumferential region 28. Therefore, the influence of the shrinkage of the suction side head 231 affects the tilting pad bearing 95, and the risk that the bearing clearance is narrowed and the seizure occurs can be reduced in the tilting pad bearing 95. In addition, the connection portion 42A connecting the inner circumferential region to the outer circumferential region is formed to cross part of the annular groove portion 40A in the circumferential direction Dc. Therefore, the region in which the connection portion 42A is formed has higher rigidity than the region in which the annular groove portion 40A is formed. Therefore, since the connection portion 42A is formed, the tilting pad bearing 95 can be supported in a stable state as compared with a case in which the groove surrounds the tilting pad bearing 95 over the entire circumference. In addition, in the tilting pad bearing 95, the load received from the rotating shaft 31 acts most on the suction side head 231 at the position at which the pivot 97 is disposed. The connection portion 42A overlaps with the position at which such a pivot 97 is disposed. As a result, in order to support the load received from the rotating shaft 31, the rigidity required for the suction side head 231 can be efficiently secured by the connection portion 42A. As a result, it is possible to stably support the bearing and suppress the influence of the heat shrinkage occurring over the entire circumference of the bearing on the bearing.

In addition, the connection portion 42A is disposed at a position overlapping with the pivot 97 positioned at the lowermost side in the vertical direction Dv, which is the load support point, in the width direction Dw. Since the pivot 97 positioned at the lowermost side in the vertical direction Dv is the load support point, the load received from the rotating shaft 31 is the largest. The connection portion 42A overlaps with the pivot 97 at the lowermost end. As a result, in order to support the load received from the rotating shaft 31, the rigidity required for the suction side head 231 can be further efficiently secured by the connection portion 42A. As a result, the bearing can be more stably supported.

In addition, the annular groove portion 40A is formed as single groove on the bottom surface 237b so that a region other than the connection portion 42A surrounds the tilting pad bearing 95 as viewed from the axial direction Da. That is, the annular groove portion 40A surrounds the tilting pad bearing 95 in the region other than the connection portion 42A in the circumferential direction Dc as viewed from the axial direction Da. Therefore, the influence of the heat shrinkage of the suction side head 231 over the entire circumference of the tilting pad bearing 95 is less likely to affect the tilting pad bearing 95 in many regions of the circumferential direction Dc. As a result, it is possible to effectively suppress the influence of the heat shrinkage that occurs over the entire circumference of the bearing on the bearing.

In addition, the annular groove portion 40A is formed to be disposed in the recess portion 237 as viewed from the first side Da1 in the axial direction Da. The bottom surface 237b, which is the surface of the suction side head 231 in which the recess portion 237 is formed, faces the outside of the casing 2 and is directed to the first side Da1 in the axial direction Da. Therefore, the inner surface that forms the recess portion 237 is exposed to the external atmosphere (outside air) in which the compressor 1 is installed. As a result, the temperature is higher than that in the casing 2. Further, the outside air having a temperature higher than that of the working fluid G in the casing 2 also flows into the annular groove portion 40A connected to such a recess portion 237. As a result, it is difficult for the temperature of the region around the suction side head 231 in which the annular groove portion 40A is formed to drop, and the heat shrinkage is suppressed. Therefore, the influence of the heat shrinkage of the casing 2 on the bearing can be more effectively suppressed.

In addition, the compressor 1 further includes the lubricating oil supply unit 70. The lubricating oil is supplied to the tilting pad bearing 95 by the lubricating oil supply unit 70 via the oil supply path 981. The supplied lubricating oil is discharged into the recess portion 237 from a gap between the rotating shaft 31 and the tilting pad bearing 95 after being used in the tilting pad bearing 95. Since the discharged lubricating oil is exposed to the rotating shaft 31 that is rotated at a high speed during the operation of the compressor 1, the temperature of the lubricating oil is higher than that of the working fluid G due to the heat generated between the rotating shaft 31 and the tilting pad bearing 95. Since the lubricating oil of which the temperature is increased in this way is discharged into the recess portion 237, the temperature of the inner surface of the recess portion 237 is increased. As a result, the influence of the heat shrinkage of the casing 2 on the bearing can be more effectively suppressed.

In addition, the suction port 7 sucks the working fluid G into the casing 2 from the lower side in the vertical direction Dv. As a result, in a case in which the working fluid G has a low temperature, the heat shrinkage is larger at the lower portion of the suction side head 231 in which the suction port 7 is positioned. On the other hand, the connection portion 42A is positioned below the pivot 97 on the lowermost end on the lower side in the vertical direction Dv with respect to the axis O as viewed from the axial direction Da. That is, the connection portion 42A is formed at a position overlapping with the suction port 7 as viewed from the axial direction Da. Therefore, the rigidity can be improved by the connection portion 42A in the region in which the heat shrinkage is the largest. As a result, the bearing can be more stably supported.

In addition, the working fluid G has a fluid temperature of 0° C. or lower at the suction port 7. By sucking the working fluid G having a temperature of 0° C. or lower into the casing 2, the heat shrinkage of the casing 2, particularly the suction side head 231 is large. In such a compressor 1, by providing the annular groove portion 40A, it is possible to effectively suppress the influence of the heat shrinkage of the casing 2 on the bearing.

Modification Example of Embodiment

It should be noted that, in the embodiment described above, one bearing pad of the plurality of bearing pads 96 of the tilting pad bearing 95 is positioned directly below the axis O in the vertical direction Dv, but the position of the bearing pad 96 is not limited thereto.

Figure 4:
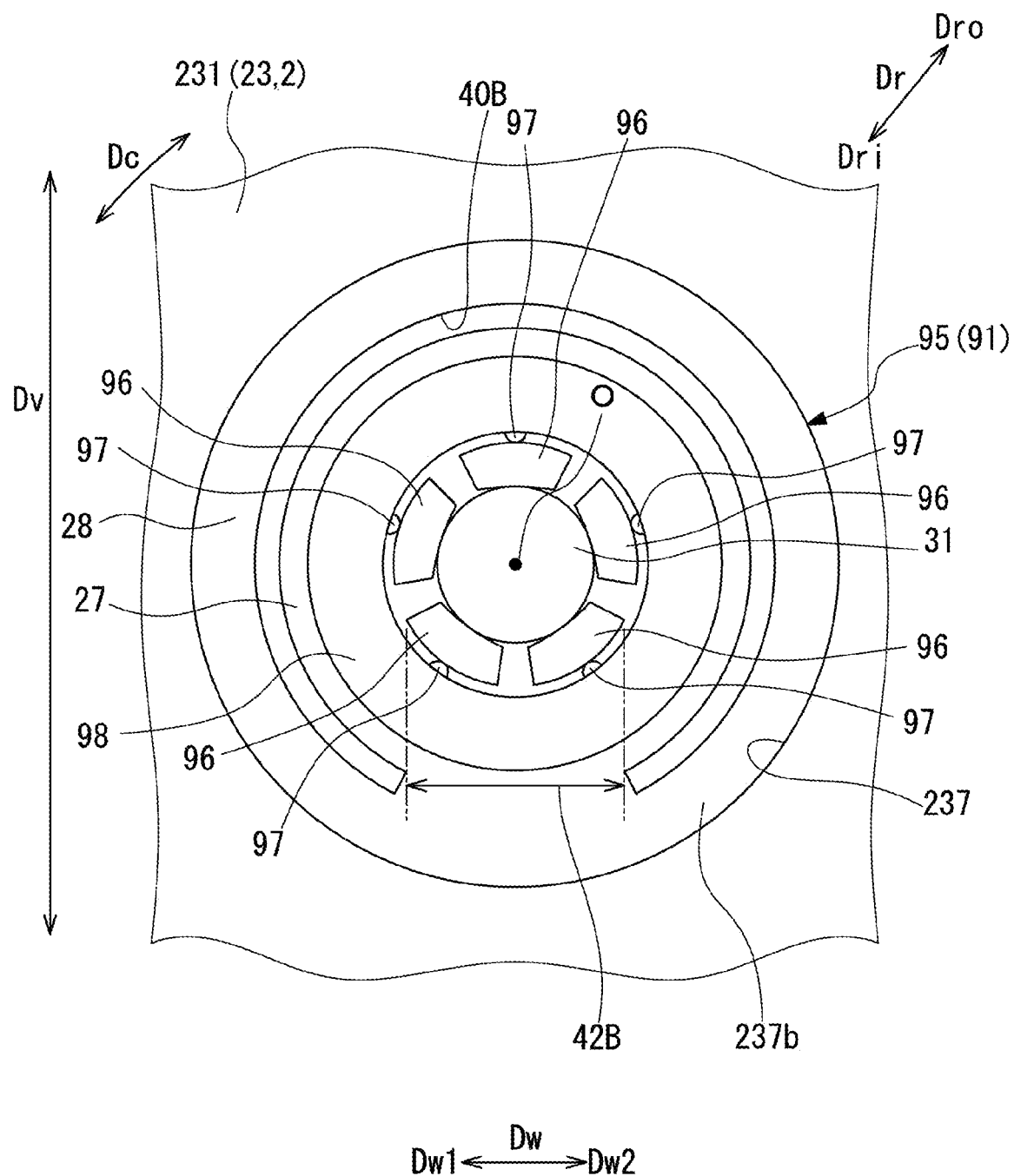
FIG. 4 is an enlarged view of a first bearing portion in a modification example of the present embodiment.

For example, as shown in FIG. 4, two bearing pads positioned at the lowermost side among the plurality of bearing pads 96 may be offset from each other on both sides in the width direction Dw directly below the axis O in the vertical direction Dv. That is, the plurality of bearing pads 96 are disposed so as not to overlap with the region directly below the axis O. As a result, in the modification example, two of the lowermost bearing pads among the plurality of bearing pads 96 are disposed at positions equally distant from the axis O in the width direction Dw.

In a case in which the tilting pad bearing 95 is disposed in this way, it is preferable that a connection portion 42B be formed at a position overlapping with the two bearing pads 96 positioned at the lowermost side among the plurality of tilting pad bearings 95 as viewed from the axial direction Da. It is more preferable that the connection portion 42B be formed at a position overlapping with the pivot 97 that supports the two bearing pads 96 positioned at the lowermost side as viewed from the axial direction Da. Therefore, the annular groove portion 40B having an annular shape according to the modification example has a shorter length in the circumferential direction Dc than the annular groove portion 40A according to the embodiment.

Even in such a configuration as the embodiment described above, it is possible to stably support the bearing. It is possible to suppress the influence of the heat shrinkage occurring over the entire circumference of the bearing.

Other Embodiments

In the above, the embodiment of the present disclosure has been described with reference to the drawings, but the configuration is not limited to that of the embodiment and may include design changes or the like without departing from the gist of the present disclosure.

In the embodiment described above, the centrifugal compressor 1 is described as an example, but the compressor may also have a different structure, such as that of an axial flow compressor. In addition, even in a case of the described centrifugal compressor, the number of diaphragms 22, impellers 32, or the like is not limited to the example structure used in the present embodiment.

In addition, the structures of the groove portions 40A and 40B having an annular shape in the present embodiment are not limited thereto. For example, the region in which the connection portions 42A and 42B are formed may overlap with a pivot other than the pivot on the lowermost side.

In addition, the structure of the suction side head 231 is not limited to the example structure of the present embodiment. For example, in the suction side head 231, the recess portion 237 may be omitted.

In addition, the tilting pad bearing 95 may be disposed in the second bearing portion 92, and the groove portions 40A and 40B having the annular shape, or the connection portions 42A and 42B may be formed in the discharge side head 232. In this case, the recess portion 237 may be formed in the discharge side head 232.

<Supplementary Notes>

The compressor 1 described in the embodiment may be understood as follows, for example.

(1) A first aspect relates to a compressor 1 including a rotor 3 having a rotating shaft 31 extending in an axial direction Da in which an axis O extends and is rotatable around the axis O, a casing 2 having a suction port 7 sucking a working fluid G inside and configured to cover the rotor 3 from an outer side Dro in a radial direction Dr with respect to the axis O, and a tilting pad bearing 95 configured to support the rotating shaft 31 in the casing 2, in which the tilting pad bearing 95 includes a plurality of bearing pads 96 arranged at intervals in a circumferential direction Dc about the axis O and being in sliding contact with an outer circumferential surface of the rotating shaft 31, and a pivot 97 supported by the casing 2, and configured to support each of the plurality of bearing pads 96 in a swingable manner, the casing 2 includes annular groove portions 40A and 40B being recessed in the axial direction Da and extending in the circumferential direction Dc at an end portion close to the suction port 7 at a position distant from the tilting pad bearing 95 to the outer side Dro in the radial direction Dr, and a connection portion 42A connecting an inner circumferential region 27 of an inner side Dri in the radial direction Dr with respect to the annular groove portions 40A and 40B to an outer circumferential region 28 of the outer side Dro in the radial direction Dr with respect to the annular groove portions 40A and 40B to cross part of the annular groove portions 40A and 40B in the circumferential direction Dc as viewed from the axial direction Da, and the connection portion 42A is disposed at a position at which a position in a width direction Dw overlaps with the pivot 97 as viewed from the axial direction Da, the width direction Dw is orthogonal to a vertical direction.

As a result, the influence of the heat shrinkage is blocked by the annular groove portion 40A, and the shrinkage in the region of the inner side Dri in the radial direction Dr with respect to the annular groove portion 40A is suppressed. Therefore, in the casing 2, the shrinkage in the inner circumferential region 27 to which the tilting pad bearing 95 is fixed is suppressed as compared with the outer circumferential region 28. Therefore, the influence of the shrinkage of the casing 2 affects the tilting pad bearing 95, and the risk that the bearing clearance is narrowed and the seizure occurs can be reduced in the tilting pad bearing 95. In addition, the region in which the connection portion 42A is formed has higher rigidity than the region in which the annular groove portion 40A is formed. Therefore, the tilting pad bearing 95 can be supported in a stable state as compared with a case in which the groove is formed to surround the tilting pad bearing 95 over the entire circumference. In addition, in the tilting pad bearing 95, the load received from the rotating shaft 31 acts most on the casing 2 at the position at which the pivot 97 is disposed. The connection portion 42A is overlaps with the position at which such a pivot 97 is disposed. As a result, in order to support the load received from the rotating shaft 31, the rigidity required for the casing 2 can be efficiently secured by the connection portion 42A. As a result, it is possible to stably support the bearing and suppress the influence of the heat shrinkage occurring over the entire circumference of the bearing on the bearing.

(2) A second aspect relates to the compressor 1 according to (1), in which the connection portion 42A is disposed at a position overlapping with a load support point at which the tilting pad bearing 95 receives a load of the rotating shaft 31 in the width direction Dw as viewed from the axial direction Da.

As a result, the connection portion 42A is disposed to overlap with the pivot 97 which is the load support point. As a result, in order to support the load received from the rotating shaft 31, the rigidity required for the casing 2 can be more efficiently secured by the connection portion 42A. As a result, the bearing can be more stably supported.

(3) A third aspect relates to the compressor 1 according to (1) or (2), in which the annular groove portions 40A and 40B is a single groove and is such that a region other than the connection portion 42A surrounds the tilting pad bearing 95 as viewed from the axial direction Da.

As a result, the annular groove portion 40A surrounds the tilting pad bearing 95 in the region other than the connection portion 42A in the circumferential direction Dc as viewed from the axial direction Da. Therefore, the influence of the heat shrinkage of the casing 2 over the entire circumference of the tilting pad bearing 95 is less likely to affect the tilting pad bearing 95 in many regions of the circumferential direction Dc. Therefore, it is possible to effectively suppress the influence of the heat shrinkage that occurs over the entire circumference of the bearing on the bearing.

(4) A fourth aspect relates to the compressor 1 according to any one of (1) to (3), in which the casing 2 includes an external casing 21 having a cylindrical shape and extending in the axial direction Da, and a head 23 that closing an opening of the external casing 21 on a first side Da1 in the axial direction Da, the head 23 has a recess portion 237 is recessed in the axial direction Da and forming a circular shape about the axis O as viewed from the first side Da1 of the axial direction Da, and the annular groove portion 40A is formed in the head 23 and disposed in the recess portion 237 as viewed from the first side Da1 in the axial direction Da.

As a result, the surface of the head 23 on which the recess portion 237 is formed faces the outside of the casing 2 and is directed to the first side Da1 in the axial direction Da. Therefore, the inner surface that forms the recess portion 237 is exposed to the external atmosphere (outside air) in which the compressor 1 is installed. As a result, in a case in which the working fluid G sucked into the casing 2 has a low temperature, the temperature of the inner surface of the recess portion 237 is higher than that of the casing 2. Further, the outside air having a temperature higher than that of the working fluid Gin the casing 2 also flows into the annular groove portion 40A connected to the recess portion 237. As a result, it is difficult for the temperature of the region around the head 23 in which the annular groove portion 40A is formed to drop, and the heat shrinkage is suppressed. Therefore, the influence of the heat shrinkage of the casing 2 on the bearing can be more effectively suppressed.

(5) A fifth aspect relates to the compressor 1 according to (4), further including a lubricating oil supply unit 70 configured to supply lubricating oil to the tilting pad bearing 95, in which the lubricating oil supplied to the tilting pad bearing 95 by the lubricating oil supply unit 70 configured to discharge into the recess portion 237.

As a result, the supplied lubricating oil is discharged into the recess portion 237 after being used in the tilting pad bearing 95. Since the discharged lubricating oil is exposed to the rotating shaft 31 that is rotated at a high speed during the operation of the compressor 1, the temperature of the lubricating oil is higher than that of the working fluid G due to the heat generated between the rotating shaft 31 and the tilting pad bearing 95. Since the lubricating oil of which the temperature is increased in this way is discharged into the recess portion 237, the temperature of the inner surface of the recess portion 237 is increased. As a result, the influence of the heat shrinkage of the casing 2 on the bearing can be more effectively suppressed.

(6) A sixth aspect relates to the compressor 1 according to any one of (1) to (5), in which the suction port 7 configured to suck the working fluid G from an outside of the casing 2 from a lower side in the vertical direction Dv in the casing 2, and the connection portion 42A overlaps with the suction port 7 as viewed from the axial direction Da.

As a result, in a case in which the working fluid G has a low temperature, the heat shrinkage is larger at the lower portion of the casing 2 in which the suction port 7 is positioned. The rigidity can be improved by the connection portion 42A in the region in which the heat shrinkage is the largest. As a result, the bearing can be more stably supported.

EXPLANATION OF REFERENCES

1 . . . Centrifugal compressor (compressor)
2 . . . Casing
3 . . . Rotor
5 . . . Seal portion
51 . . . First seal portion
52 . . . Second seal portion
7 . . . Suction port
8 . . . Discharge port
100 . . . Bundle
21 . . . External casing
210 . . . End plate
22 . . . Diaphragm
23 . . . Head
231 . . . Suction side head
232 . . . Discharge side head
237 . . . Recess portion
237b . . . Bottom surface
27 . . . Inner circumferential region
28 . . . Outer circumferential region
25 . . . Casing flow path
31 . . . Rotating shaft
31a . . . First end portion
31b . . . Second end portion
32 . . . Impeller
40A, 40B . . . Annular groove portion 42A, 42B . . . Connection portion
70 . . . Lubricating oil supply unit
91 . . . First bearing portion
92 . . . Second bearing portion
95 . . . Tilting pad bearing
96 . . . Bearing pad
96f . . . Pad surface
96g . . . Pad back surface
97 . . . Pivot
98 . . . Bearing housing
981 . . . Oil supply path
Da . . . Axial direction
Da1 . . . First side
Da2 . . . Second side
Dc . . . Circumferential direction
Dr . . . Radial direction
Dri . . . Inner side
Dro . . . Outer side
Dw . . . Width direction
G . . . Working fluid
O . . . Axis

What is claimed is:

1. A compressor comprising:
a rotor that:
comprises a rotating shaft extending in an axial direction in which an axis extends, and
is rotatable around the axis;
a casing that:
comprises a suction port sucking a working fluid inside, and
covers the rotor from an outer side in a radial direction with respect to the axis; and
a tilting pad bearing that supports the rotating shaft in the casing, wherein
the tilting pad bearing comprises:
bearing pads disposed at intervals in a circumferential direction about the axis and that are in sliding contact with an outer circumferential surface of the rotating shaft;
pivots supported by the casing, each of which supports a corresponding one of the bearing pads in a swingable manner; and
a bearing housing fixed to the casing and having an inner circumferential surface to which the pivots are fixed,
the casing further comprises:
an external casing having a cylindrical shape and extending in the axial direction;
a suction side head that closes a first opening of the external casing on a first side in the axial direction;
a discharge side head disposed farther from the suction port than the suction side head is and that closes a second opening of the external casing on a second side in the axial direction;
an annular groove portion formed on the suction side head but not on the discharge side head, wherein the annular groove portion is recessed in the axial direction and extends on the suction side head in the circumferential direction; and
a connection portion connecting a radially inner region of the casing with respect to the annular groove portion to a radially outer region of the casing with respect to the annular groove portion such that the connection portion crosses part of the annular groove portion in a width direction of the casing as viewed from the axial direction,
the annular groove portion is away from the tilting pad bearing and toward the outer side in the radial direction,
as viewed from the axial direction, the connection portion overlaps a load support point of the tilting pad bearing in the width direction, the load support point being where the tilting pad bearing receives a load of the rotating shaft,
a lowermost one of the pivots in a vertical direction toward a lower side of the casing is disposed at the load support point, the vertical direction being orthogonal to the width direction,
the connection portion overlaps in the width direction with the lowermost one of the pivots as viewed from the axial direction,
the connection portion is disposed below the lowermost one of the pivots in the vertical direction as viewed from the axial direction,
in a bottom surface of the suction side head, the radially inner region is connected to the radially outer region only via the connection portion,
the bottom surface faces an outside of the suction side head and is directed to the first side in the axial direction,
a region in which the connection portion is formed has higher rigidity than a region in which the annular groove portion is formed, and
in the axial direction, a depth of the annular groove portion in the suction side head is greater than a length of the bearing housing.

2. The compressor according to claim 1, wherein the annular groove portion is a single groove and is formed such that a region other than the connection portion surrounds the tilting pad bearing as viewed from the axial direction.

3. The compressor according to claim 1, wherein
the suction side head comprises a recess portion recessed in the axial direction and forming a circular shape about the axis as viewed from the first side in the axial direction, and
the annular groove portion is disposed in the recess portion as viewed from the first side in the axial direction.

4. The compressor according to claim 3, further comprising:
a lubricating oil supply unit configured to supply lubricating oil to the tilting pad bearing, wherein
the lubricating oil supplied to the tilting pad bearing by the lubricating oil supply unit is configured to discharge into the recess portion.

5. The compressor according to claim 1, wherein
the suction port is configured to suck the working fluid from an outside of the casing from a lower side of the casing in the vertical direction, and
the connection portion overlaps with the suction port as viewed from the axial direction.

* * * * *